Patented Feb. 22, 1944

2,342,350

UNITED STATES PATENT OFFICE 2,342,350

COVERING FOR HEADS OF DRESSED POULTRY

Carl H. Koonz and James D. Ingle, Chicago, Ill., assignors to Industrial Patents Corporation, Chicago, Ill., a corporation of Delaware No Drawing. Application March 8, 1940,
Serial No. 323,000

16 Claims. (Cl. 99—169)

This invention relates to a method of preparing poultry for market.

One of the objects of this invention is to provide a method of improving the appearance of poultry for market purposes.

Another object of this invention is to provide a method of protecting the edible surfaces of poultry from digestive exudate.

Another object of this invention is to provide a method of covering the heads of poultry with a coating material adapted to seal the head.

Other objects and advantages of this invention will become apparent from the description and claims which follow.

In the poultry industry, the poultry, such as chickens, turkeys, ducks, geese, and other edible birds, are commonly marketed with the heads attached. The head of the poultry presents an undesirable appearance because of discoloration which is traceable to bleeding of the poultry. Exudate from the digestive tract invariably flows from the mouth of the slaughtered bird, which also presents an undesirable appearance, and is particularly undesirable because it contaminates the package, and, more important, it contaminates the edible surfaces, causing an early deterioration of these surfaces. The contamination of the surfaces results in the production of off flavors and odors. As a general rule, the heads of the poultry present an ugly appearance, particularly to the housewife.

The problems of covering the head and eliminating the hazards due to contamination of the edible surfaces by the exudate has confronted the poultry industry for a long period. In order to obscure the ugly head, some producers of dressed poultry have placed a wax paper covering over the head and secured the covering by means of a rubber band or some other such means in an attempt to retain the covering over the head. Such covering requires a costly hand operation and the covering is not entirely satisfactory. The covering cannot be sealed and as a result it is not capable of preventing the digestive exudate from flowing out of the mouth of the poultry and onto the edible surfaces. The paper covering is easily torn and is readily dislodged, particularly when the poultry is removed from the shipping box by the dealer. If the paper wrapper becomes torn or dislodged from the head, its purposes are defeated.

The present invention contemplates the use of a liquid coating which is adapted to solidify, thicken, or congeal and form an adherent coating and seal for the head of the poultry. The coating is preferably one in which the head may be dipped and which thereafter set up to form an adherent plastic seal. The coating is preferably one which is somewhat flexible at temperatures below 32 degrees F. and is not tacky or sticky at 70 degrees to 80 degrees F.

Coating materials which are satisfactory for the purposes of our invention are asphalts, gelatins and glues, both flexible and insoluble forms, and wax-rubber resin compositions. It is obvious to those skilled in the art that other types of compositions capable of setting up into a solid or semi-plastic form may be employed in the practice of our invention.

In the commercial practice of our invention, after the poultry has been slaughtered and dressed, the head and a sufficient portion of the neck may be submerged in the liquid coating and sealing composition and then withdrawn and the poultry placed in storage. It is apparent that the sealing and coating composition may be applied to the head by other means, such as spraying, or painting the composition on the head, or pouring the composition over the head.

Other compositions which are satisfactory include petroleum waxes and petrolatums having melting points between about 115 degrees to 175 degrees F., beeswax, vegetable waxes and various types of resins, but we prefer to employ a composition consisting of petroleum waxes and a small proportion of a rubber resin.

The synthetic rubber resin is a thermoplastic condensation derivative or product of rubber prepared by reacting rubber latex in solution in an organic solvent immiscible in water, with a halide of an amphoteric metal, for example, stannic chloride, ferric chloride, or aluminum chloride. The resulting solution of the reaction product is poured into a large volume of water containing a reducing agent, such as sodium sulfite, and the mixture is then agitated vigorously to produce a fine emulsion. The organic solvent is then removed by steam distillation and the synthetic rubber resin is precipitated in a finely divided state. The preparation of this synthetic rubber resin is described in United States Patent No. 2,052,423, granted August 25, 1936.

The preferred mixture of petroleum wax and the synthetic rubber resin is particularly advantageous since the wax composition has a greater tensile strength and a greater pliability over a longer temperature range than common paraffin or wax-like substances. The addition of the synthetic rubber resin to the petroleum wax composition increases the hardness and toughness of the wax. The wax will not crack or chip from the surface of the head of the bird, although the temperature may be reduced substantially below 32 degrees F. This wax does not become sticky or tacky at temperatures as high as 90 degrees to 100 degrees F. This preferred wax composition is strongly adherent to the surfaces of the head and will penetrate into small crevices to form an effective seal about the mouth of the bird, thereby preventing exudate from the digestive tracts from contaminating the surfaces of the bird or from imparting a very undesirable appearance to the package or to the dealer's cabinets.

The preferred coating composition consists essentially of 10 per cent petroleum scale wax having a melting point of between 120 degrees and 130 degrees F., 45 per cent of an amorphous petroleum wax having a melting point between 150 degrees and 160 degrees F., 40 per cent of an amorphous petroleum wax having a melting point between 135 degrees and 145 degrees F., and 5 per cent of the synthetic rubber resin.

In preparing the coating composition, the petroleum waxes are melted and mixed and heated to a temperature of about 220 degrees F. The desired quantity of finely divided synthetic rubber resin is added and mixed with the melted wax. The mixture is then agitated vigorously until it begins to thicken and is then allowed to stand for from 15 minutes to 30 minutes. The rubber resin first begins to swell, and when the mixture is reheated to about 220 degrees F., a homogeneous liquid mass is formed. The proportion of the synthetic rubber resin may vary, dependent upon the initial properties of the wax and the properties desired in the final coating composition. The method of preparing the wax composition containing synthetic rubber resins is described in detail in the co-pending application of James D. Ingle and Leon D. Mink entitled Cheese coating, Serial No. 267,175, filed April 10, 1939.

It is apparent that if it is desired to improve the appearance of the poultry, the coating composition may be colored with a desired dye or pigment. It is also apparent that if desired, the head of the poultry may be dipped into the coating composition and then the coated head may be placed in a mould whereby the wax composition may be moulded into a desired design.

It is apparent that the coating composition will completely obscure the ugly head of the slaughtered poultry, making the poultry far more attractive, particularly to the housewife. The coating composition forms a complete seal about the head of the bird, thereby eliminating all exudate from contaminating the surfaces of the bird. The coating compositions, since they are adherent to the surfaces of the head, will not become easily dislodged, and with a coating having an extended plastic range, the coating will serve to effectively seal the head without the danger of breaking or chipping of the composition and breaking of the seal.

We claim:

1. In a method of preparing poultry for market, the step which comprises coating the head of the poultry with a homogeneous mixture of wax and synthetic rubber resin.

2. In a method of preparing poultry for market, the step which comprises coating the head of the poultry with a homogeneous mixture of petroleum wax and synthetic rubber resin.

3. In a method of preparing poultry for market, the step which comprises coating the head of the poultry with a composition comprising a mixture of petroleum scale wax having a melting point between 120 degrees and 130 degrees F., an amorphous petroleum wax having a melting point between 150 degrees and 160 degrees F., an amorphous petroleum wax having a melting point between 135 degrees and 145 degrees F., and synthetic rubber resin.

4. In a method of preparing poultry for market, the step which comprises coating the head of the poultry with a composition comprising a mixture of 10 per cent petroleum scale wax having a melting point between 120 degrees and 130 degrees F., 45 per cent of an amorphous petroleum wax having a melting point between 150 degrees and 160 degrees F., 40 per cent of an amorphous petroleum wax having a melting point between 135 degrees and 145 degrees F., and 5 per cent synthetic rubber resin.

5. In a method of preparing poultry for market, the step of coating the head of the dressed poultry carcass with a waxy coating composition comprising a mixture of synthetic rubber resin and amorphous petroleum wax to protect the surface of the carcass against digestive and other exudate.

6. In a method of preparing poultry for market, the step of coating the head of the dressed poultry carcass with a waxy coating composition comprising a mixture of synthetic rubber resin and a petroleum wax having a melting point between about 115° F. to 175° F. to protect the surface of the carcass against digestive and other exudate.

7. In a method of preparing poultry for market, the improvement which comprises coating the head of the dressed poultry carcass with a waxy composition comprising a mixture of synthetic rubber resin, amorphous petroleum wax of melting point about 135° F. to 145° F., and an amorphous petroleum wax of melting point of about 150° F. to 160° F. to protect the surface of the carcass against digestive and other exudate.

8. In a method of preparing poultry for market, the step of coating the head of the dressed poultry carcass with a waxy coating composition to protect the surface of the carcass against digestive and other exudate, said coating composition containing amorphous petroleum wax in such amount that the composition is flexible and substantially non-cracking at temperatures of about 32° F. and is substantially non-tacky at temperatures of about 90° F. to 100° F.

9. A method according to claim 8 in which the amorphous petroleum wax has a melting point within the range of about 135° F. to 145° F.

10. A method according to claim 8 in which the amorphous petroleum wax has a melting point within the range of about 150° F. to 160° F.

11. In a method of preparing poultry for market, the improvement which comprises coating the head of the dressed poultry carcass with a waxy composition to protect the surface of the carcass against digestive and other exudate, said composition containing mainly a mixture of amorphous petroleum waxes of melting points of about 135° F. to 145° F. and about 150° F. to 160° F. respectively, and being substantially non-cracking at temperatures of about 32° F. and substantially non-tacky at temperatures of about 90° F. to 100° F.

12. In a method of preparing poultry for market, the steps which comprise covering the head of the dressed poultry with a liquid coating composition whereby the composition flows into the crevices, and allowing the coating to congeal and form an adherent plastic seal to protect the surface of the carcass against digestive and other exudate.

13. In a method of preparing poultry for market, the steps which comprise dipping the head of the dressed poultry into a liquid coating composition whereby the composition flows into the crevices, and allowing the coating to congeal and form an adherent plastic seal to protect the surface of the carcass against digestive and other exudate.

14. In a method of preparing poultry for market, the steps which comprise covering the head of the dressed poultry with a liquid waxy coating composition whereby the composition flows into the crevices, and allowing the coating to congeal and form an adherent plastic seal to protect the surface of the carcass against digestive and other exudate.

15. In a method of preparing poultry for market, the steps which comprise coating the head of the dressed poultry with a liquid plastic composition which is somewhat flexible at temperatures below 32° F. and is not tacky or sticky at 70° F. to 80° F. and allowing the coating to congeal and form an adherent plastic seal to protect the surface of the carcass against digestive and other exudate.

16. In a method of preparing poultry for market, the steps which comprise dipping the head of the poultry in a liquid wax coating composition to form a coating around the head and to seal in digestive and other exudate, and then placing the coated bird in a mold whereby the wax coating is molded into a design.

CARL H. KOONZ.
JAMES D. INGLE.